US012803866B2

(12) United States Patent
Rowe et al.

(10) Patent No.: US 12,803,866 B2
(45) Date of Patent: Nov. 17, 2026

(54) METHOD FOR MANAGING A CONNECTION LOSS FOR A DISTRIBUTED SYSTEM

(71) Applicants: Robert Bosch GmbH, Stuttgart (DE); CARNEGIE MELLON UNIVERSITY, Pittsburgh, PA (US)

(72) Inventors: Anthony Rowe, Pittsburgh, PA (US); Arne Hamann, Ludwigsburg (DE); Behnaz Pourmohseni, Munich (DE); Dakshina Narahari Dasari, Renningen (DE); Fedor Smirnov, Erlangen (DE); Michael Pressler, Karlsruhe (DE); Nuno Pereira, Pittsburgh, PA (US); Shruti Lall, Pittsburgh, PA (US)

(73) Assignees: ROBERT BOSCH GMBH, Stuttgart (DE); CARNEGIE MELLON UNIVERSITY, Pittsburgh, PA (US)

( * ) Notice: Subject to any disclaimer, the term of this patent is extended or adjusted under 35 U.S.C. 154(b) by 66 days.

(21) Appl. No.: 18/822,526

(22) Filed: Sep. 3, 2024

(65) Prior Publication Data

US 2025/0080400 A1 Mar. 6, 2025

(30) Foreign Application Priority Data

Sep. 6, 2023 (DE) ..................... 10 2023 208 597.6

(51) Int. Cl.
*H04L 41/0654* (2022.01)

(52) U.S. Cl.
CPC ................................ *H04L 41/0654* (2013.01)

(58) Field of Classification Search
None
See application file for complete search history.

(56) References Cited

U.S. PATENT DOCUMENTS

2003/0182592 A1* 9/2003 Massa ................. G06F 11/0727 714/E11.024
2004/0267901 A1* 12/2004 Gomez ................... G06F 9/542 709/217
2019/0340088 A1* 11/2019 Sanakkayala ....... G06F 11/0757
2020/0112628 A1* 4/2020 Barszczak ........... G06F 11/1687
2022/0166696 A1* 5/2022 Sadu ........................ H04L 67/12
2025/0021437 A1* 1/2025 Juneja ................... G06F 9/5077

* cited by examiner

*Primary Examiner* — Younes Naji
(74) *Attorney, Agent, or Firm* — NORTON ROSE FULBRIGHT US LLP

(57) ABSTRACT

A method for managing a connection loss for a distributed system. The method includes: deploying at least one support module on at least two sender runtimes, on at least one receiver runtime, and on at least one orchestrator of the distributed system, wherein the at least one support module is configured to provide transmission of a signal on an additional communication channel, wherein the orchestrator is configured to manage regular communication between the at least two sender runtimes and the at least one receiver runtime; analyzing the additional communication channel between the at least two sender runtimes and the orchestrator to detect the connection loss of at least one of the at least two sender runtimes in each case based on a detection of the transmitted signal on the additional communication channel; initiating at least one countermeasure in the case of the detected connection loss.

11 Claims, 4 Drawing Sheets

METHOD FOR MANAGING A CONNECTION LOSS FOR A DISTRIBUTED SYSTEM

CROSS REFERENCE

The present application claims the benefit under 35 U.S.C. § 119 of German Patent Application No. DE 10 2023 208 597.6 filed on Sep. 6, 2023, which is expressly incorporated herein by reference in its entirety.

FIELD

The present invention relates to a method for managing a connection loss for a distributed system. The present invention furthermore relates to a computer program, a device and a storage medium for this purpose.

BACKGROUND INFORMATION

Over the past decade, the availability and processing power of cloud resources and edge resources has increased dramatically. This trend may be largely brought about by several advantages—such as better resource utilization, fault tolerance and application availability—of monolithic applications across a (dynamically changing) set of heterogeneous resource nodes.

While cloud servers can provide enormous computing power and almost limitless elasticity, transmitting data between the end device and the cloud can require relatively long and widely varying transmission times, i.e., the transmission time to and from the cloud server can have high latency and considerable jitter. As a result, application distribution efforts may have initially focused mainly on timing-insensitive applications, such as those in the business, scientific computing or machine learning sectors.

Real-time and safety-critical CPS (cyber-physical systems) have meanwhile been deployed particularly as a monolith, wherein the processing (responsible for control/decision making) and the sensor parts and actuator parts of the application are all deployed on the same device at the point of use. However, with the greater distribution of edge resources and high-bandwidth communications, it may now be possible to realize high-speed communication between the field device and a powerful edge node (in particular with runtimes in a millisecond range), so that the processing part of the CPS application can be offloaded to a more powerful compute node, whereby the distribution benefits outlined above are used effectively, while the field device can manage only the sensor functionality and actuator functionality.

Use cases in which timing-sensitive CPS applications are distributed across a network of edge resources may have been successfully deployed in the laboratory to demonstrate the benefits of distribution. However, the inherent unreliability of communication networks at the point of use, where individual network nodes may be susceptible to intermittent interruptions, can still pose a significant problem for the practical distributed deployment of real-time-critical CPS systems, which may be particularly sensitive to packet loss resulting from disconnection.

Cloud orchestration frameworks, such as Kubernetes, can use a more traditional approach to fault tolerance since they can use general protocols with very strong properties, such as Paxos or Raft. However, this design decision can introduce significant overheads in terms of messages and the number of required duplicates. For example, etcd, Kubernetes' highly consistent distributed key value store used in particular to maintain the cluster state, can have significant network requirements, for example 1 GbE for typical deployments. Although this may not be surprising, since cloud orchestration is designed for data centers with significant network and computing, such requirements may not be well suited for resource-poor distributed embedded systems. These protocols may be too much for highly synchronous systems, such as an industrial automation system or motor vehicle control system.

Existing middleware solutions in particular lack the capabilities to recognize resource disconnections quickly enough to realize failover within milliseconds and to manage the new connection of resources in a way that is transparent to the application. Existing approaches can mostly target connection failures in data centers and may have significant network requirements and data processing requirements. Some existing efforts to make faster failover times possible may rely on additional mechanisms provided by the (software-defined) network.

SUMMARY

According to aspects of the present invention, a method, a computer program, a data processing device, and a computer-readable storage medium are provided. Example embodiments, features, and details of the present invention are disclosed herein. Features and details described in the context of the method according to the present invention also correspond to the computer program according to the present invention, the data processing device according to the present invention and the computer-readable storage medium according to the present invention, and vice versa in each case.

According to one aspect of the present invention, a method for managing a connection loss for a distributed system is provided. According to an example embodiment of the present invention, the method comprises the following steps:

- Deploying at least one support module on at least two sender runtimes, on at least one receiver runtime, and on at least one orchestrator of the distributed system, wherein the at least one support module is designed to provide transmission of a signal on an additional communication channel, wherein the orchestrator is designed to manage regular communication between the at least two sender runtimes and the at least one receiver runtime,
- Analyzing the additional communication channel between the at least two sender runtimes and the orchestrator in order to detect the connection loss of at least one of the at least two sender runtimes in each case on the basis of a detection of the transmitted signal on the additional communication channel,
- Initiating at least one countermeasure in the case of the detected connection loss, wherein the at least one countermeasure comprises stopping the regular communication between the at least one of the at least two sender runtimes with the detected connection loss and the at least one receiver runtime by means of the at least one support module in order to manage the connection loss in the distributed system.

According to an example embodiment of the present invention, the distributed system may be a distributed information technology system, for example a cloud system. The sender runtime may be a runtime that comprises or hosts a sender module. The receiver runtime may be a runtime that comprises or hosts a receiver module. In one example, an application may run on the receiver runtime, which requires data from the sender runtime, for which the regular communication between the sender runtime and the receiver runtime is provided. The orchestrator may be a decision-making entity, which has a global view of the distributed system, and may be able to deploy and undeploy modules on runtimes and to control their communication behavior. Analyzing the additional communication channel may comprise regular verification by means of the detection in order to verify whether the transmitted signal is present or was present within a defined time period. The transmitted signal may be a digital signal, for example a character string or a bit sequence. Stopping the regular communication may be initiated by the at least one of the at least two sender runtimes when the connection loss is detected. Simply put, in one example, the support module of a sender runtime can detect that no signal has been transmitted by the support module of the orchestrator for a defined time period, so the sender runtime can stop the regular communication. The additional communication channel by means of the at least one support module may be advantageous insofar as it can specifically be dedicated to detecting the connection loss, and insofar as the at least one of the at least two sender runtimes can detect the connection loss so that it can stop the regular communication. This can advantageously prevent, after reconnection, the receiver runtime from being flooded with data from the sender runtime from when the connection was lost.

According to an example embodiment of the present invention, it is possible for the method to furthermore comprise the following steps:

- Initiating the transmission of the signal on the additional communication channel in an interval by means of the at least one support module,
- Analyzing a presence of the transmitted signal in order to detect the connection loss, wherein the presence of the transmitted signal is analyzed by the at least two sender runtimes and/or the orchestrator.

It is possible for the signal to be transmitted and detected by means of at least one support module. In one example, a support module can be provided on a sender runtime and can transmit the signal to another support module provided on the orchestrator, which can then analyze the presence of the transmitted signal and can thereby detect the connection loss, or vice versa. The term "presence" can indicate that the transmitted signal is present at a given time or was present or detected within a defined time period.

It is furthermore possible for the method to furthermore comprise at least one of the following steps:

- Defining the interval in which the signal is transmitted, wherein the interval is defined manually or automatically, preferably according to at least one requirement,
- Defining a time period for the transmitted signal after which the connection loss is detected.

The possibility of defining the interval may be advantageous insofar as it ensures more flexibility. For example, in a more critical application, for which the connection loss must be detected quickly, the interval may be defined to be very short, for example ten milliseconds. For less critical applications and to save data processing capacity or network capacity, the interval may be defined to be longer, for example one second. It is possible to define different intervals for different transmission directions of the signal. In one example, the signal transmitted from the orchestrator to one of the at least two sender runtimes differs from the interval from the one of the at least two sender runtimes to the orchestrator. The differing intervals can advantageously make it possible to achieve a compromise between response time and a communication overhead of the signals. Defining may also take place automatically and dynamically, for example in order to make degradation possible in a scenario in which the available network bandwidth is reduced due to connection failures or node failures. The at least one requirement may thus, for example, consist in how time-critical the application is or how much bandwidth or data processing capacity is provided. In an alternative, the time period for the transmitted signal after which the connection loss is detected may be a multiple of the interval in which the signal is transmitted. For example, if the interval in which the signal is transmitted is 10 ms, the time period may be 30 ms. Thus, if no signal is present after 30 ms, the connection loss can be detected in this case. It is also possible for a pattern of the transmitted signal to be analyzed in order to detect the connection loss. In one example, the connection loss is detected when two signals in a row or m out of k signals are not detected.

In another example embodiment of the present invention, at least one of the following three types of support modules is deployed on the at least two sender runtimes, on the at least one receiver runtime, and/or on the at least one orchestrator:

- an emitter, wherein the emitter transmits the signal,
- a detector, wherein the detector detects the signal transmitted by the emitter,
- a mute switch, wherein the mute switch stops the regular communication between the at least one of the at least two sender runtimes and the at least one receiver runtime.

According to an example embodiment of the present invention, the mute switch may be deployed on the at least two sender runtimes in order to stop the regular communication. This may be advantageous since the at least two sender runtimes can then stop the regular communication without the need for an intervention by the orchestrator. In one example, the emitter and the detector may each be deployed on the at least two sender runtimes, the at least one receiver runtime, and the at least one orchestrator so that the additional communication channel can be analyzed with regard to a respective emitter, for example on one of the at least two sender runtimes, and a respective detector, for example on the at least one orchestrator.

In another example embodiment of the present invention, the at least one countermeasure furthermore comprises activating temporary regular communication between at least one of the at least two sender runtimes in which no connection loss is detected and the at least one receiver runtime. In other words, the regular communication between the at least one of the at least two sender runtimes in which the connection loss is detected can be temporarily replaced by the temporary regular communication of another of the at least two sender runtimes in which no connection loss is detected, preferably until the at least one of the at least two sender runtimes in which the connection loss is detected is reconnected to the at least one receiver runtime. As soon as the connection is restored, the regular communication can thus be re-activated and the temporary regular communication can be deactivated.

According to an example embodiment of the present invention, it is furthermore possible that activating the temporary regular communication between the at least one of the at least two sender runtimes in which no connection loss is detected and the at least one receiver runtime is carried out by the orchestrator. This may be advantageous since the orchestrator may have a global view of all sender runtimes and receiver runtimes that may be present in the distributed system and, in particular, furthermore with respect to a possible connection loss of a respective runtime.

According to an example embodiment of the present invention, the method may furthermore comprise the following step:

Analyzing the additional communication channel between the at least two sender runtimes for detecting the connection loss of the at least one of the at least two sender runtimes on the basis of the transmission of the signal between the at least two sender runtimes.

This may be advantageous because the sender runtimes then respectively detect a possible connection loss independently and without the orchestrator. It may be provided that, if the connection loss is detected on one of the sender runtimes, the at least one other sender runtime initiates the provision of the regular communication with the at least one receiver runtime.

In another aspect of the present invention, a computer program can be provided, in particular a computer program product, comprising instructions which, when the computer program is executed by a computer, cause the computer to perform the method according to the present invention. The computer program according to the present invention can thus have the same advantages as described in detail with reference to a method according to the present invention.

In another aspect of the present invention, a data processing device can be provided which is designed to perform the method according to the present invention. As the device, a computer may, for example, be provided, which executes the computer program according to the present invention. The computer may comprise at least one processor, which can be used to execute the computer program. Additionally, a non-volatile data memory can be provided, in which the computer program can be stored and from which the computer program can be read by the processor for execution.

According to another aspect of the present invention, a computer-readable storage medium can be provided, comprising the computer program according to the present invention and/or instructions which, when they are executed by a computer, cause the computer to perform the steps of the method according to the present invention. The storage medium can be formed as a data storage device, such as a hard disk and/or a non-volatile memory and/or a memory card and/or a semiconductor drive. The storage medium may, for example, be integrated into the computer.

Furthermore, the method according to the present invention can be implemented as a computer-implemented method.

Further advantages, features and details of the present invention become apparent from the following description, in which embodiments of the present invention are described in detail with reference to the figures. In this context, the features disclosed herein may be essential to the present invention individually or in any combination.

DETAILED DESCRIPTION OF EXAMPLE EMBODIMENTS

Figure 1:
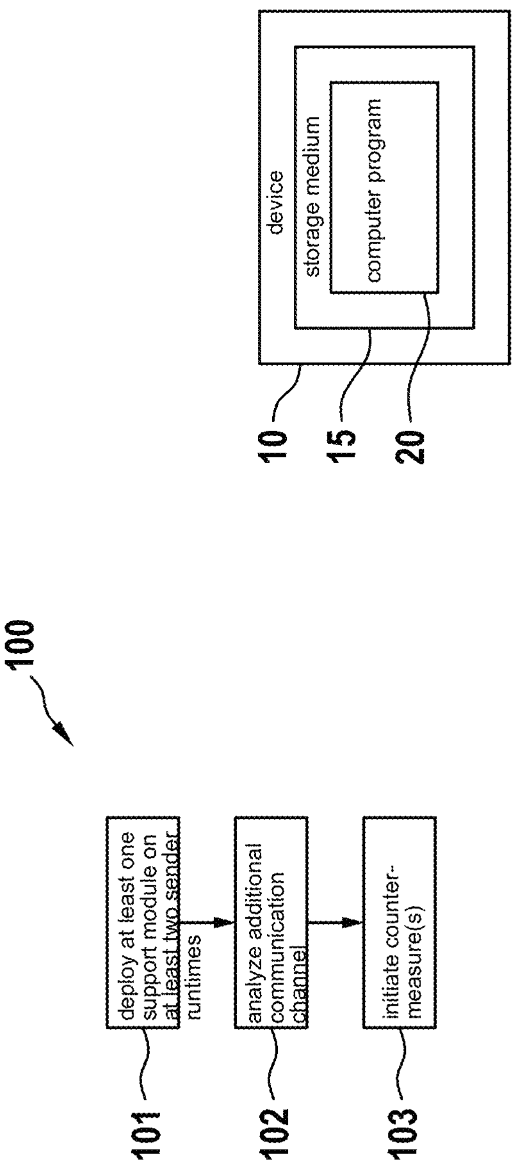
FIG. 1 shows a method, a computer program, a storage medium and a device according to example embodiments of the present invention.

FIG. 1 shows a computer program 20, a storage medium 15 and a device 10 according to embodiments of the present invention.

FIG. 1 furthermore shows a method 100 for managing a connection loss for a distributed system 1 according to embodiments of the present invention. In a first step 101, at least one support module 5 can be deployed on at least two sender runtimes 2, on at least one receiver runtime 3, and on at least one orchestrator 4 of the distributed system 1. The at least one support module 5 is preferably designed to provide transmission of a signal on an additional communication channel. The orchestrator 4 is in particular designed to manage regular communication between the at least two sender runtimes 2 and the at least one receiver runtime 3. In a second step 102, the additional communication channel between the at least two sender runtimes 2 and the orchestrator 4 can be analyzed in each case in order to detect the connection loss of at least one of the at least two sender runtimes 2 on the basis of a detection of the transmitted signal on the additional communication channel. In a third step 103, at least one countermeasure can be initiated in the case of a detected connection loss. The at least one countermeasure can comprise stopping the regular communication between the at least one of the at least two sender runtimes 2 with the detected connection loss and the at least one receiver runtime 3 by means of the at least one support module 5 in order to manage the connection loss in the distributed system 1.

The present invention focuses in particular on a failover mechanism for intermittent connection failures in distributed systems 1. It can be assumed that the system comprises a set of distributed (compute) nodes, which can be connected via a communication network, and that a so-called runtime can be deployed on each of the nodes. A runtime may be a program that can access the resources of the node on which it is deployed, in order to start executable files, which are referred to as modules. In addition to starting modules and monitoring their execution, runtimes can also manage communication between modules. In order to transmit a message generated by a sending module, the runtime hosting the module can intercept the message and then inject it into the communication network in order to transmit it to the runtime hosting the receiving module. The runtime hosting the receiving module can receive the message and provide it to the receiving module.

Applications, provided as a set of deployable modules, can be deployed by an orchestrator 4. The orchestrator 4 may be a decision-making entity, which has a global view of the system, and may be able to deploy and undeploy modules on runtimes and to control their communication behavior. In particular, the orchestrator 4 can "mute" a module by configuring its runtime host to stop transmitting the messages that the module generates. The orchestrator 4 can determine the mapping of module to runtime of the deployed applications, monitor their execution, and implement failover mechanisms in order to protect the deployed applications from dynamic failures (e.g., connection failures or node failures).

Figure 2:
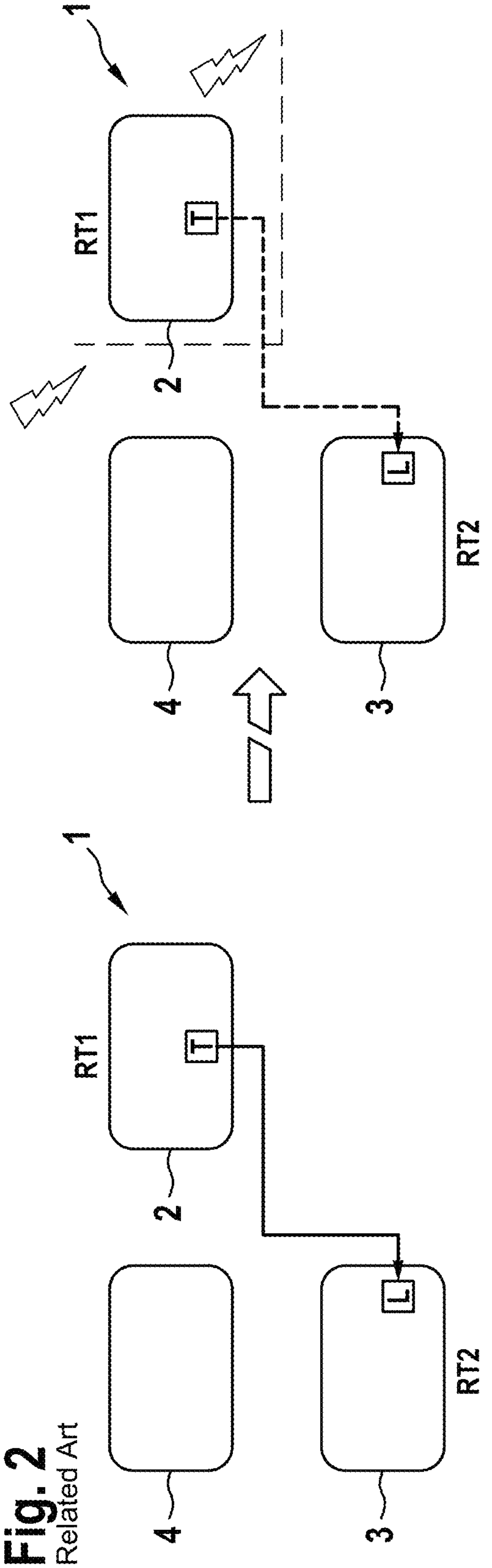
Fig. 2 Related Art
FIG. 2 shows a distributed system according to the related art.

FIG. 2 shows a failure scenario addressed by embodiments of the present invention. In a distributed system 1, which can comprise a plurality of runtimes 2, 3 and can be managed by an orchestrator 4, an application can be deployed by distributing its modules to the available runtimes 2, 3. For the sake of simplicity, the example in particular uses a minimal application that comprises a sender module T, which may also be referred to as a speaker and produces data, and a listener-receiver module L, which may also be referred to as a listener and consumes these data. These modules could, for example, represent a control task (speaker) that calculates a control signal that is then sent to the actuator task (listener). The right part of the figure in particular highlights the disconnection vulnerability of this deployment: as soon as RT 1 is disconnected, the listener may not be able to receive the received data and the application may fail.

Figure 3:
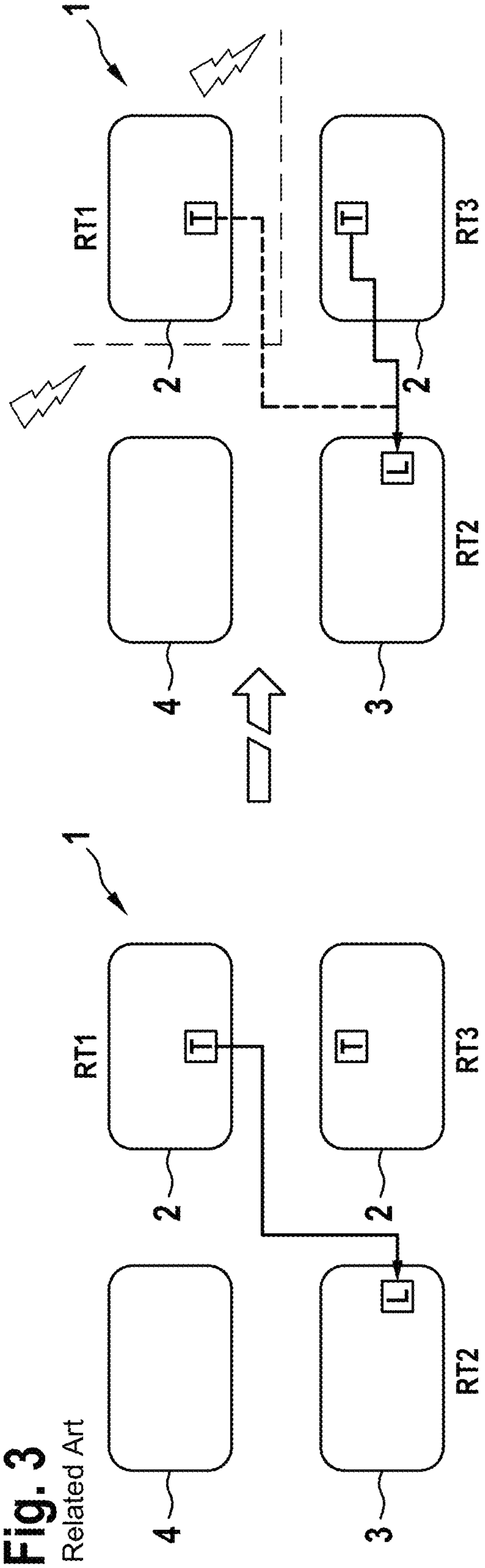
Fig. 3 Related Art
FIG. 3 shows a distributed system according to the related art.

FIG. 3 shows how a hot standby deployment of a task duplicate can harden the application against the disconnection of a runtime. As stated above, the orchestrator 4 can selectively deactivate the communication capability of individual modules. This capability can be used to deploy a "muted" duplicate of the sender module T on RT 3 as a "backup" for the communicating "primary" sender module T on RT 1. Since the orchestrator 4 can detect a disconnection (which, as outlined below, may be difficult), the orchestrator 4 can respond by activating the communication capability of the backup sender module T, which can then generate the data required by the receiver module L, so that the application may not be affected by the disconnection and can continue its execution.

Figure 4:
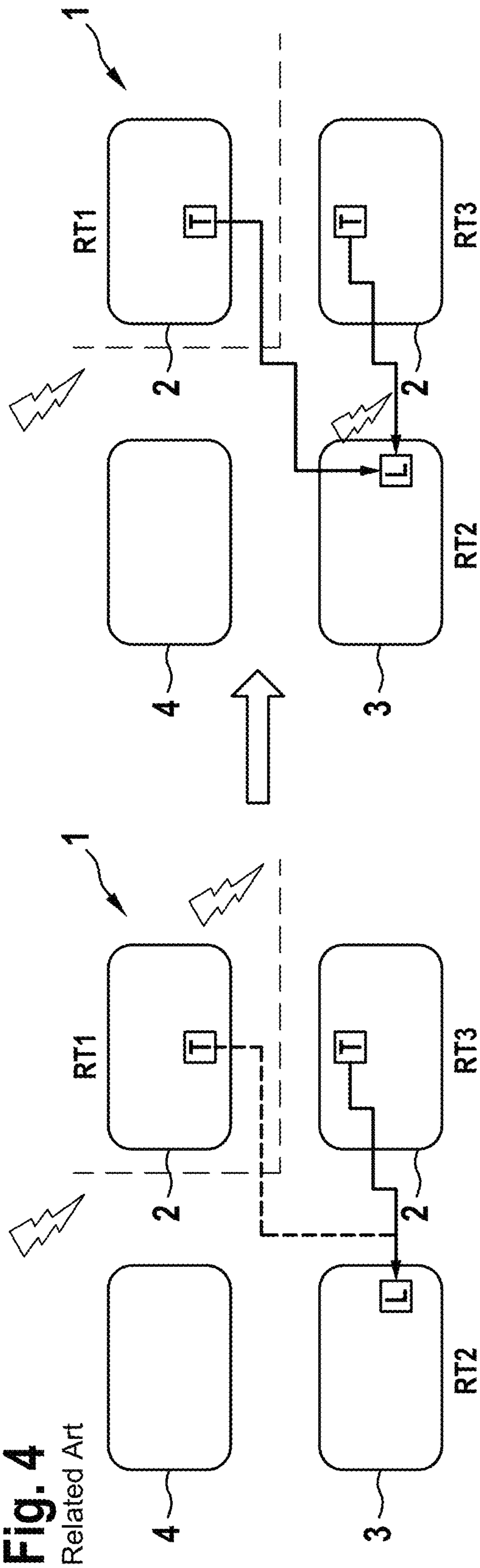
Fig. 4 Related Art
FIG. 4 shows a distributed system according to the related art.

However, this scheme may not be sufficient to handle the intermittent disconnection scenario (which can be a fairly common failure in large-scale networks), wherein RT 1 rejoins the network after being disconnected for a time interval, as shown in FIG. 4. As soon as RT 1 rejoins the network, the receiver module L may start to receive duplicate messages, which can cause application failure unless the application is specifically written in a way that allows it to handle duplicate messages, a functionality that most applications typically lack. Note that the capability of the orchestrator 4 to mute and unmute modules may not be sufficient to address this scenario. Until it is disconnected, the sender module T on RT 1 can act as the failover primary device and can generate messages. During the time RT 1 is disconnected, the orchestrator 4 may not be able to mute the module, since it cannot communicate with RT 1. While the orchestrator 4 may be implemented to mute one of the sender modules T as soon as it detects the reconnection, it may not be able to prevent the receiver module L from receiving duplicate messages for a certain time interval, with potentially catastrophic consequences for the application.

In the previous explanations, it was in particular assumed that the orchestrator 4 is able to detect a runtime disconnection with sufficient speed to perform the failover, i.e., activate the backup, before the application fails. For real-time-critical CPS applications, which may be particularly sensitive to packet loss, the entire middleware response chain, i.e., (a) detecting the disconnection, (b) making the decision to determine the response, and (c) implementing the response, must in particular be completed within very short time intervals (in the range of milliseconds), thus requiring, for example, a detection mechanism that can detect the disconnection in an even shorter time. Most mechanisms for detecting a disconnection in a distributed system 1 may be based on some kind of periodic heartbeat, a scheme in which a message is periodically sent between a trusted reliable node (for example, the node on which the orchestrator 4 is deployed) and the monitored node. As long as the heartbeat is received regularly, the monitored node can be considered to be connected, while the absence of the heartbeat message can signal a disconnection. While most existing middleware and communication protocols come with built-in heartbeat functionality, it may typically be impossible to configure heartbeat periods that would be sufficiently short to make disconnection detection possible with enough speed to provide failover for CPS applications. The smallest possible configurable time periods can typically be about one second. One possible reason for this is that reducing the heartbeat period can increase the amount of the message sent through the network, potentially to a point where the disturbance/network load from these messages could impact the deployed applications.

The present invention can provide such a failover mechanism. It can be used to harden real-time-critical applications against the disconnection of runtimes after an intermittent failure of network connections. It may not require any adaptations of the application or specific assumptions about it, nor any failure detection mechanisms or recovery mechanisms offered by the underlying communication protocol. The application can be treated as a black box and can be completely agnostic about its distributed deployment.

In comparison to existing solutions, the present invention can offer at least the following advantages. Detection of disconnection situations and reconnection situations within milliseconds of their occurrence, without having to rely on mechanisms offered by the underlying communication protocol. A mechanism for triggering a low-latency failover using hot standby deployments. A mechanism for managing the modules on a disconnected runtime during the time the runtime is disconnected from the network. A mechanism for managing a previously disconnected runtime when it reconnects to the network. All advantages listed above can be provided in a way that is completely transparent to the running application and may not require any adaptation of the application code or application behavior.

One aim of the present invention may be to harden a distributed real-time application against intermittent disconnection. The mechanism can be based on the idea that, in addition to the application modules, the orchestrator 4 can also deploy so-called sidecar modules. Sidecars may be specialized orchestration modules that can be deployed on the runtimes together with the modules of the application. They in particular realize error handling policies in order to (a) detect the disconnection of runtimes, (b) manage and/or monitor communication behavior of the application modules, (c) observe and/or manage runtimes if they are disconnected from the network and consequently from the orchestrator 4, (d) detect when runtimes reconnect to the network, and/or (e) cooperate with the orchestrator 4 in order to reintegrate reconnected runtimes into the system. In the context of the present invention, the sidecar modules can be synonymously referred to as support modules 5. For this deployment, the orchestrator 4 can consider the computing requirements and networking requirements of the application and of the sidecar modules in order to ensure that the chosen deployment meets the resource requirements and real-time constraints of the application. The mechanism of these sidecars can make an extremely fast failover possible and does not need to rely on failure detection mechanisms or failure response mechanisms offered by the underlying communication protocol.

In addition, it may not require any adaptation of the application code, so that it can even be used to "subsequently install" the error handling functionality of an existing application. By bringing the orchestration closer to the processing, the proposed sidecar mechanism can thus extend temporal and spatial locality of recovery logic of distributed systems 1.

In addition to the general mechanism of using sidecars, i.e., support modules 5, a scheme for managing the disconnection-reconnection scenario according to an embodiment of the present invention is described below for orchestration tasks. The scheme is in particular based on dynamically deployed support modules 5 for generating runtime heartbeats and managing the communication behavior of application modules, wherein the application is transparently shielded from (a) runtime disconnection due to (transient) connection failure, and (b) potential disturbances caused by reconnecting previously disconnected runtimes.

Figure 5:
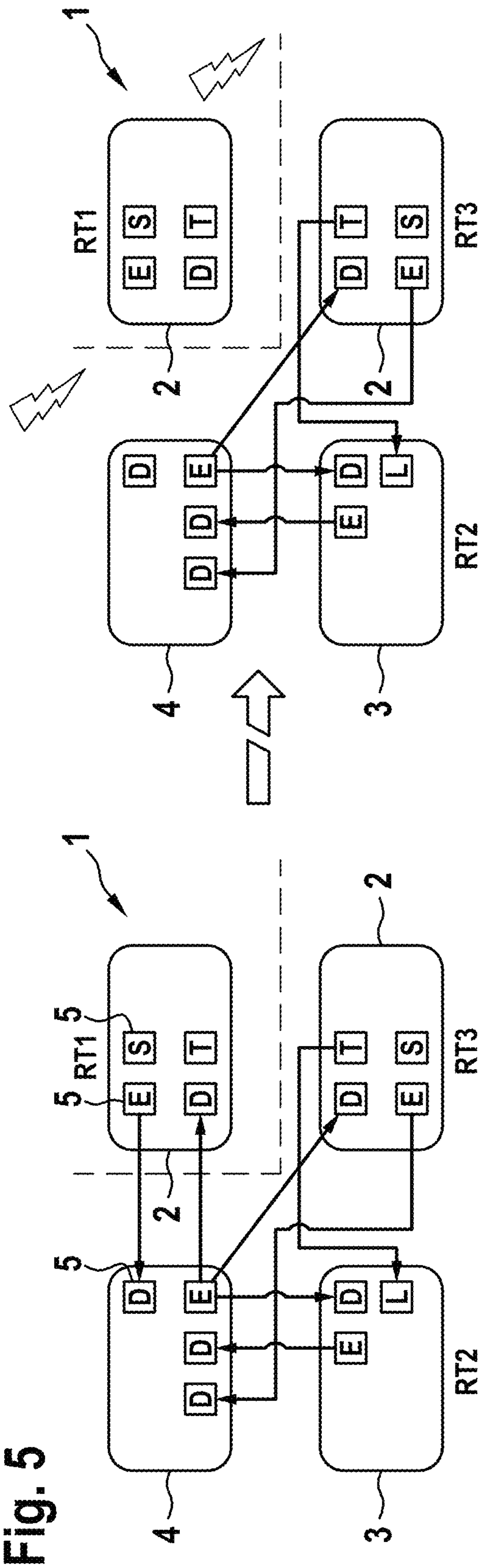
FIG. 5 shows a distributed system according to example embodiments of the present invention.

FIG. 5 visually shows a plurality of possible components of the approach of the present invention to addressing the intermittent disconnection scenario. As explained in the previous sections, the approach can be based on the use of sidecars, i.e., support modules 5. The scheme depicted in FIG. 5 in particular uses three different types of support modules 5: (a) an emitter E, which, after being deployed on a runtime, can publish or transmit a signal or, more specifically, a heartbeat message with a period that can be dynamically configured, preferably by the orchestrator 4, (b) a detector D, which can be responsible for listening to a particular heartbeat, detecting its absence, i.e., a disconnection, and triggering the disconnection response of the orchestrator 4 and/or of other support modules 5, and (c) a mute switch S, which, upon receiving the trigger signal from the detector D, can configure the runtime on which it is hosted in order to deactivate the communication of other modules hosted by the runtime. In order to ensure robustness against false positives, it is possible to flexibly configure what exactly is interpreted as heartbeat absence, e.g., missing two heartbeats in a row or receiving less than m out of k heartbeats. As shown in FIG. 5, the orchestrator 4 may deploy pairs of emitters E and detectors D in order to (a) monitor the connectivity status of runtimes, and (b) make it possible for the runtimes to detect when they are disconnected.

Implementing the heartbeat mechanism through sidecar modules or support modules 5 can make a more finely grained control of the heartbeat period possible: Different heartbeat periods may be configured for different runtimes. Runtimes on which more important or more sensitive tasks run may be designed to send heartbeats more often. Furthermore, different heartbeat directions may be configured. There may be a different period for (a) the heartbeat sent by the orchestrator 4 to the runtime, and (b) the heartbeat sent from the runtime to the orchestrator 4. The above can advantageously make it possible to achieve a compromise between response time and a communication overhead of the heartbeats. The reconfiguration of the heartbeat periods can even take place dynamically, for example in order to make smooth degradation possible in scenarios in which the available network bandwidth is reduced due to connection failures or node failures.

The support modules 5 are preferably deployed by the orchestrator 4, which can have a global view of the system and can consider the computing requirements and networking requirements of application modules and support modules 5 in conjunction with one another. As shown on the right side of FIG. 5, the use of the support modules 5 can allow not only very fast detection of the disconnection, but also make it possible for the orchestrator 4 to manage runtimes while they are disconnected. In the example shown, the detector D deployed on RT 1 in particular detects the disconnection and notifies (a) the emitter E to stop transmitting the heartbeat, and (b) the mute switch S to deactivate the communication capability of the application task T. This response, which, as already mentioned, could not be caused directly by the orchestrator 4, which is disconnected from RT 1 at this time, can ensure that no messages, neither the heartbeat messages nor the application messages, are sent by RT 1. The runtime can therefore now safely rejoin the network, without flooding it with messages. On the other hand, the detector D deployed on the orchestrator 4 node can detect the disconnection of RT 1 and trigger the response of the orchestrator 4, wherein (a) the communication capability of the backup task on RT 3 is activated and set as primary, and (b) a mute switch S is deployed for the sender module T on RT 3 if RT 3 is disconnected.

Figure 6:
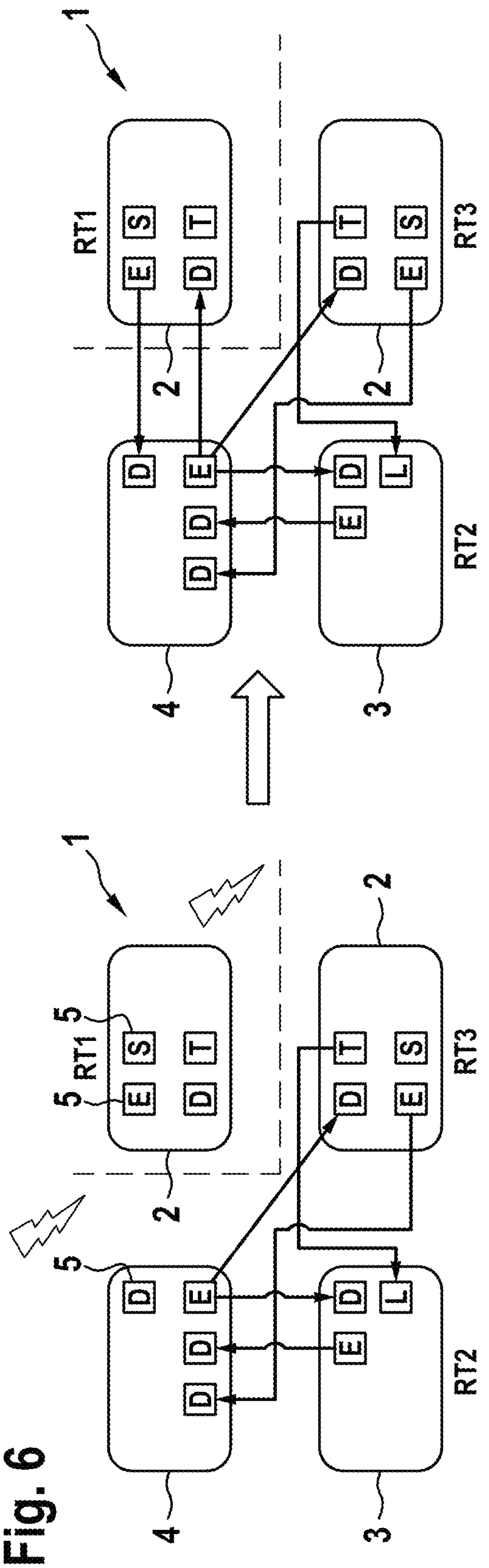
FIG. 6 shows a distributed system according to example embodiments of the present invention.

Finally, FIG. 6 shows in particular the safe reconnection made possible by the use of the support modules 5. The sequence of events can unfold as follows: (1) As soon as RT 1 is reconnected to the network, its detector D can start receiving the heartbeat sent by the emitter E on the node of the orchestrator 4. (2) The detector D can notify the reconnection to the emitter E, which in turn can resume sending the heartbeat. (3) The detector D on the node of the orchestrator 4, which is responsible for Res 1, can receive its heartbeat and can notify the orchestrator 4, which, from this point on, preferably takes back the control and management of RT 1.

An entire process according to an embodiment is described below. In the normal operating mode, the orchestrator 4 and the runtime can exchange periodic heartbeats. After the disconnection, the detector D on the runtime can detect the absence of the heartbeat of the orchestrator 4 and can deactivate the runtime heartbeat and mute application modules hosted there. When the detector D on the orchestrator 4 detects the absence of the runtime heartbeat, it preferably activates the failover by unmuting the backup sender module T. Since the orchestrator 4 may continue to send its heartbeat, the detector D on the runtime can detect it after the reconnection and can reactivate the emitter E on the runtime. The orchestrator 4 can be notified if its detector D receives the runtime heartbeat again so that it can take back control of the runtime.

Possible alternatives to the described scheme are described below, since the use of sidecars in general can offer great flexibility for these and other failure/management scenarios. Possible alternative limits would, for example, be: configuring the detectors D to listen to the application messages instead of generating an additional heartbeat. For communication schemes in which this is easily possible, such as PubSub, this can reduce the network bandwidth overhead introduced by the mechanism. For example, if a motion control application comprising a sensor and an actuator module is hardened, the detector D can be deployed on the runtime hosting the actuator module and can listen to the periodic sensor signal there, whereby a fast disconnection failover is made possible if the runtime hosting the sensor module is disconnected, without any overhead related to the network load.

In another alternative, a maximum absence time interval for application modules can be defined. In the case of a disconnection, watchdog support modules 5, for example on the middleware and the disconnected resource, can monitor how long the resource was disconnected. As soon as the absence time of a module is exceeded, the module (a) can be removed from the disconnected resource by the resource watchdog, and (b) can be redeployed on a connected resource by the middleware watchdog.

Instead of muting application modules, in another alternative, a recorder support module 5 can record messages from the application modules during the time of disconnection. Various schemes can be used for this purpose, such as recording all messages, recording the last n messages, etc. After the reconnection, the messages can be injected back into the network in a methodical manner coordinated with the middleware. This can be another example of a functionality that is implemented on a disconnected runtime and can be made possible by the sidecar concept.

In another example, the presented scheme can also be extended for use with other failover mechanisms, such as cold standby or redeployment of modules, whose runtimes have been disconnected, on other (connected) runtimes.

Furthermore, the mute switch S can additionally monitor the messages sent by the application module while it is connected, in order to detect "blabbing idiot" misbehavior, to mute the module, and to trigger the failover to a backup before it can affect the application by flooding the network. "Blabbing idiot" misbehavior may be sending messages at random times that are not synchronized with the network, or incorrect message content.

Furthermore, the possibility of managing disconnected runtimes can also be used to ensure a higher degree of autonomy with respect to the orchestrator 4, for example by deploying support modules 5 that can take over the management of the runtime in the case of a disconnection/crash of the orchestrator 4 or can autonomously migrate modules between runtimes in order to balance the computational/network load.

The above explanation of the embodiments describes the present invention in the context of examples. Of course, individual features of the embodiments can be freely combined with one another as long as this is technically reasonable, without departing from the scope of protection of the present invention.

What is claimed is:

1. A method for managing a connection loss for a distributed system, comprising the following steps:

deploying at least one support module on each of at least two sender runtimes and on at least one orchestrator of the distributed system, wherein the at least one support module deployed on the orchestrator is configured to transmit a first heartbeat signal to each of the at least two sender runtimes on an administrative communication channel, wherein the at least one support module deployed on the each of the at least two sender runtimes are configured to detect the transmitted first heartbeat signal, and wherein the orchestrator is configured to manage regular communication that takes place over a task communication channel between (a) the at least two sender runtimes and (b) at least one receiver runtime of the distributed system; and each respective one of the at least two sender runtimes that is in an active state in which the respective sender runtime performs transmissions to the at least one receiver runtime over the task communication channel performing the following:

analyzing the administrative communication channel to detect a connection loss of the respective sender runtime by detecting, by the at least one support module on the respective sender runtime, an absence of the first heartbeat signal transmitted from the orchestrator to the respective sender runtime on the administrative communication channel; and initiating at least one countermeasure in response to the detection of the connection loss, wherein the at least one countermeasure includes causing, in response to the detected absence of the first heartbeat signal, the regular communication between the respective sender runtime and the at least one receiver runtime over the task communication channel to stop by the at least one support module of the respective sender runtime locally deactivating transmission of application messages from the respective sender runtime.

2. The method according to claim 1, wherein:

the method further comprises initiating the transmission of the first heartbeat signal on the administrative communication channel in an interval using the at least one support module deployed on the at least one orchestrator; and presence of the transmitted first heartbeat signal is monitored by each of the at least two sender runtimes.

3. The method according to claim 2, wherein the method further comprises the following steps:

defining the interval in which the first heartbeat signal is transmitted, wherein the interval is defined manually or automatically, according to at least one requirement; and defining a time period for the transmitted first heartbeat signal after which the connection loss is detected.

4. The method according to claim 1, wherein the at least one support module deployed on each respective one of the at least two sender runtimes includes the following three types of support modules:

(i) an emitter, wherein the emitter transmits a second heartbeat signal to the orchestrator, (ii) a detector, wherein the detector detects the first heartbeat signal transmitted by an emitter of the at least one support module deployed on the orchestrator, and (iii) a mute switch, wherein the mute switch stops the regular communication between the respective sender runtime and the at least one receiver runtime.

5. The method according to claim 1, wherein the at least one countermeasure further includes activating temporary regular communication between at least one of the at least two sender runtimes in which no connection loss is detected and the at least one receiver runtime.

6. The method according to claim 5, wherein the activating of the temporary regular communication between the at least one of the at least two sender runtimes in which no connection loss is detected and the at least one receiver runtime is carried out by the orchestrator.

7. The method according to claim 1, wherein the method further comprises the following step:

analyzing, by a respective one of the sender runtimes, the administrative communication channel for a second heartbeat signal transmitted by another of the sender runtimes to detect a connection loss between the respective sender runtime and the other sender runtime.

8. The method according to claim 1, wherein:

each respective one of the at least two sender runtimes transmits a second heartbeat signal to the orchestrator over the administrative communication channel;

the orchestrator analyzes the administrative communication channel to detect a communication drop with one of the sender runtimes that was in the active state based on an absence of the second heartbeat signal from the respective sender runtime; and in response to detecting the communication drop, the orchestrator causes another of the at least two sender runtimes to take over a task previously assigned to the respective sender runtime with which the communication drop was detected, including performing transmissions to the at least one receiver runtime over the task communication channel.

9. The method according to claim 8, wherein the orchestrator continues transmitting the first heartbeat signal to the respective sender runtime with which the communication drop was detected even while transmission of application messages from the respective sender runtime is locally deactivated and the task previously assigned to the respective sender runtime is performed by the other sender runtime.

10. A distributed data processing system comprising:

a processing system that includes at least one processor; and a memory coupled to the processing system storing instructions that are executable by the at least one processor, and that, when executed by the at least one processor, cause the distributed data processing system to execute at least one support module on each of at least two sender runtimes running on respective ones of nodes of the distributed system and on at least one orchestrator running on one of the nodes of the distributed system, wherein the at least one support module deployed on the orchestrator is configured to transmit a first heartbeat signal to each of the at least two sender runtimes on an administrative communication channel, wherein the at least one support module deployed on the each of the at least two sender runtimes are configured to detect the transmitted first heartbeat signal, and wherein the orchestrator is configured to manage regular communication that takes place over a task communication channel between (a) the at least two sender runtimes and (b) at least one receiver runtime of the distributed system; and each respective one of the at least two sender runtimes that is in an active state in which the respective sender runtime performs transmissions to the at least one receiver runtime over the task communication channel is configured to:

analyze the administrative communication channel to detect a connection loss of the respective sender runtime by detecting, by the at least one support module on the respective sender runtime, an absence of the first heartbeat signal transmitted from the orchestrator to the respective sender runtime on the administrative communication channel; and initiate at least one countermeasure in response to the detection of the connection loss, wherein the at least one countermeasure includes causing, in response to the detected absence of the first heartbeat signal, the regular communication between the respective sender runtime and the at least one receiver runtime over the task communication channel to stop by the at least one support module of the respective sender runtime locally deactivating transmission of application messages from the respective sender runtime.

11. A non-transitory computer-readable storage medium on which are stored instructions for managing a connection loss for a distributed system, the instructions, when executed by a computer, causing the computer to perform the following steps:

deploying at least one support module on each of at least two sender runtimes and on at least one orchestrator of the distributed system, wherein the at least one support module deployed on the orchestrator is configured to transmit a first heartbeat signal to each of the at least two sender runtimes on an administrative communication channel, wherein the at least one support module deployed on the each of the at least two sender runtimes are configured to detect the transmitted first heartbeat signal, and wherein the orchestrator is configured to manage regular communication that takes place over a task communication channel between (a) the at least two sender runtimes and (b) at least one receiver runtime of the distributed system; and each respective one of the at least two sender runtimes that is in an active state in which the respective sender runtime performs transmissions to the at least one receiver runtime over the task communication channel performing the following:

analyzing the administrative communication channel to detect a connection loss of the respective sender runtime by detecting, by the at least one support module on the respective sender runtime, an absence of the first heartbeat signal transmitted from the orchestrator to the respective sender runtime on the administrative communication channel; and initiating at least one countermeasure in response to the detection of the connection loss, wherein the at least one countermeasure includes causing, in response to the detected absence of the first heartbeat signal, the regular communication between the respective sender runtime and the at least one receiver runtime over the task communication channel to stop by the at least one support module of the respective sender runtime locally deactivating transmission of application messages from the respective sender runtime.

* * * * *